United States Patent
Sheng

[11] Patent Number: 6,109,544
[45] Date of Patent: Aug. 29, 2000

[54] HOSE TAKE-UP APPARATUS

[76] Inventor: Chih-Sheng Sheng, No. 100, Tzu Chiang W. Road, Kweishan Hsiang, Tao-Yuan Hsien, Taiwan

[21] Appl. No.: 09/337,645

[22] Filed: Jun. 22, 1999

[51] Int. Cl.[7] .................................................. B65H 75/00
[52] U.S. Cl. ......................... 239/195; 239/197; 239/198; 137/355.12; 137/355.17; 137/355.23; 137/355.28; 226/118.5; 242/388.91
[58] Field of Search ..................................... 239/195, 196, 239/197, 198; 137/355.12, 355.17, 355.23, 355.28; 226/118.4, 118.5; 242/388.9, 388.91

[56] References Cited

U.S. PATENT DOCUMENTS

| | | | |
|---|---|---|---|
| 1,244,030 | 10/1917 | Cave | 239/195 X |
| 2,184,363 | 12/1939 | Schultz et al. | 137/355.28 |
| 2,266,334 | 12/1941 | Rice | 239/195 X |
| 3,507,433 | 10/1970 | Davidow | 226/118.5 X |
| 3,710,819 | 1/1973 | Williamson | 137/355.17 |

*Primary Examiner*—Lesley D. Morris
*Assistant Examiner*—Robin O. Evans
*Attorney, Agent, or Firm*—Rosenberg, Klein & Lee

[57] ABSTRACT

A hose take-up apparatus, which includes a flat casing defining a flat receiving chamber having a relatively narrower middle portion and relatively broader upper and lower portions, a twin line welding hose received in the receiving chamber inside the casing, the twin line welding hose having a fixed input end fixedly secured to the back side wall of the casing and connected to the gas supply tubes of the gas cylinders of a welding apparatus outside the casing and a free output end extended out of an outlet at the front side wall of the casing and connected to a welding torch, two guide members mounted in the outlet inside the casing for guiding the twin line welding hose in and out of the casing, and a winding mechanism mounted inside the casing to automatically take up the twin line welding hose.

3 Claims, 10 Drawing Sheets

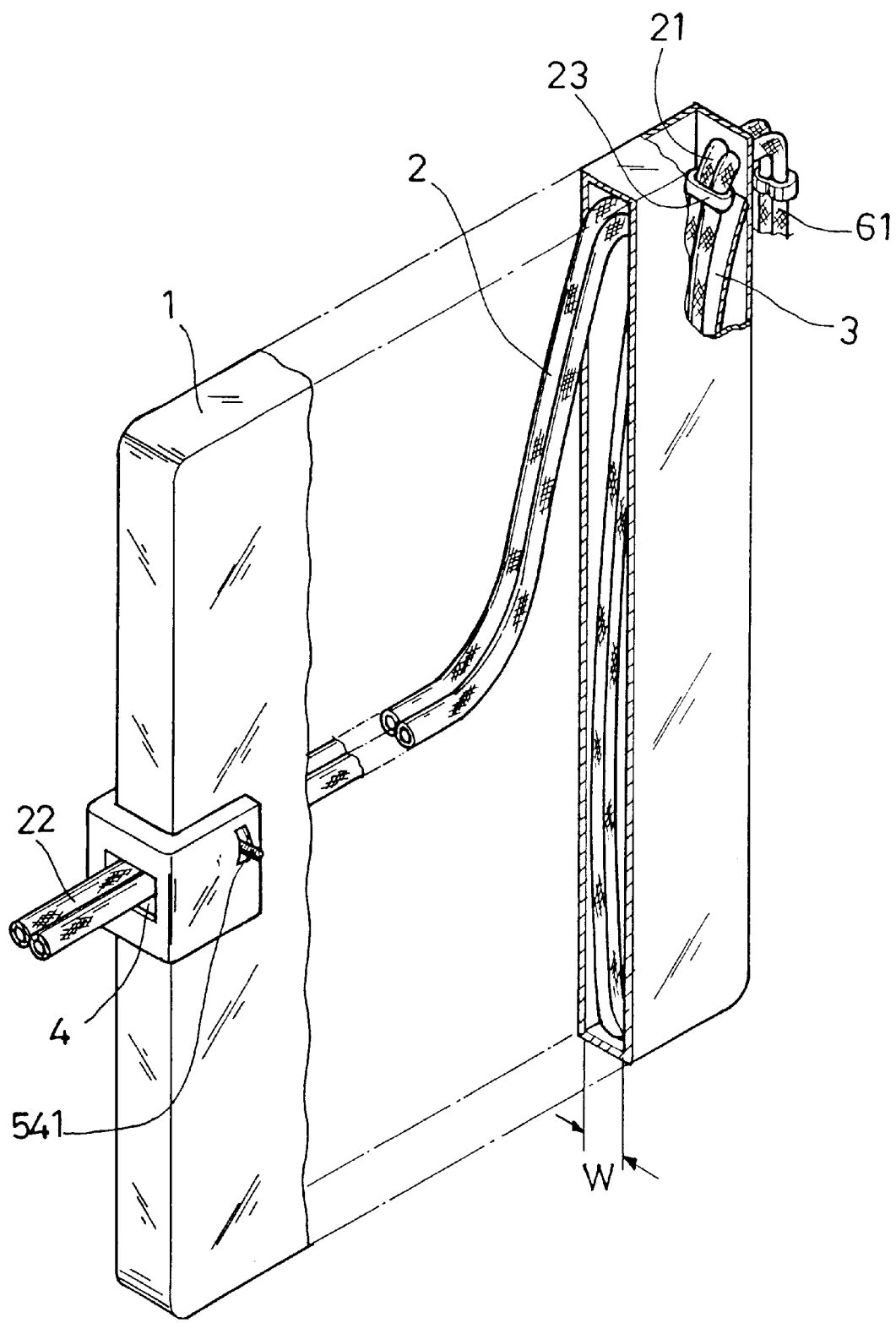
F I G. 1

HOSE TAKE-UP APPARATUS

BACKGROUND OF THE INVENTION

The present invention relates to a hose take-up apparatus for taking up a twin line welding hose being used with a gas welding apparatus, and more particularly to such a hose take-up apparatus which has guide means to guide the twin line welding hose in and out of the casing thereof, enabling the twin line welding hose to be received in a good order when not in use.

A regular gas welding apparatus is generally comprised of an acetylene cylinder, an oxygen cylinder, a cutting torch (or welding torch), and a twin line welding hose connected between the acetylene cylinder and oxygen cylinder and the cutting torch. When not in use, the twin line welding hose is directly wound round the cylinders and the peripheral frame structure of the gas welding apparatus. When the twin line welding hose is received, it tends to be tangled. FIG. 10 shows a prior art hose take-up apparatus for taking up a hose. As illustrated, the hose take-up apparatus comprises a reel A supported on a rack B, and rotated to take up a hose TL. When used with a gas welding apparatus, the two hoses C of the gas cylinders (acetylene cylinder and oxygen cylinder) are respectively connected to the reel A. Because the reel A is rotated on an axle tube D, the hoses C must be installed in the axle tube D, enabling acetylene and oxygen to be guided into the inside of the reel A, so that fuel gas mixture can be further guided from the reel A to the cutting torch (or welding torch) E through the hose TL. In order to prevent a gas leakage, axle seal means (d) must be installed to seal the gap within the reel A around the axle tube D. The structure of the axle seal means (d) is complicated. Furthermore, the axle seal means (d) wears quickly with use.

SUMMARY OF THE INVENTION

The present invention has been accomplished to provide a hose take-up apparatus, which eliminates the aforesaid drawbacks. According to one aspect of the present invention, the hose take-up apparatus comprises a flat casing defining a flat receiving chamber having a relatively narrower middle portion and relatively broader upper and lower portions, a twin line welding hose received in the receiving chamber inside the casing, the twin line welding hose having a fixed input end fixedly secured to the back side wall of the casing and connected to the gas supply tubes of the gas cylinders of a welding apparatus outside the casing and a free output end extended out of an outlet at the front side wall of the casing and connected to a welding torch, and two guide members mounted in the outlet inside the casing for guiding the twin line welding hose in and out of the casing smoothly. According to another aspect of the present invention, a winding mechanism is mounted inside the casing to automatically take up the twin line welding hose after the twin line welding hose having been pulled out of the casing. According to still another aspect of the present invention, the hose take-up apparatus can be mounted with a gas welding apparatus, enabling the gas welding apparatus to be conveniently carried on the user's back to the job site for operation.

BRIEF DESCRIPTION OF THE DRAWINGS

FIG. 1 is a cutaway view of a hose take-up apparatus according to the present invention.

FIG. 5A is an enlarged view of a part of FIG. 5.

DETAILED DESCRIPTION OF THE PREFERRED EMBODIMENT

Figure 2:
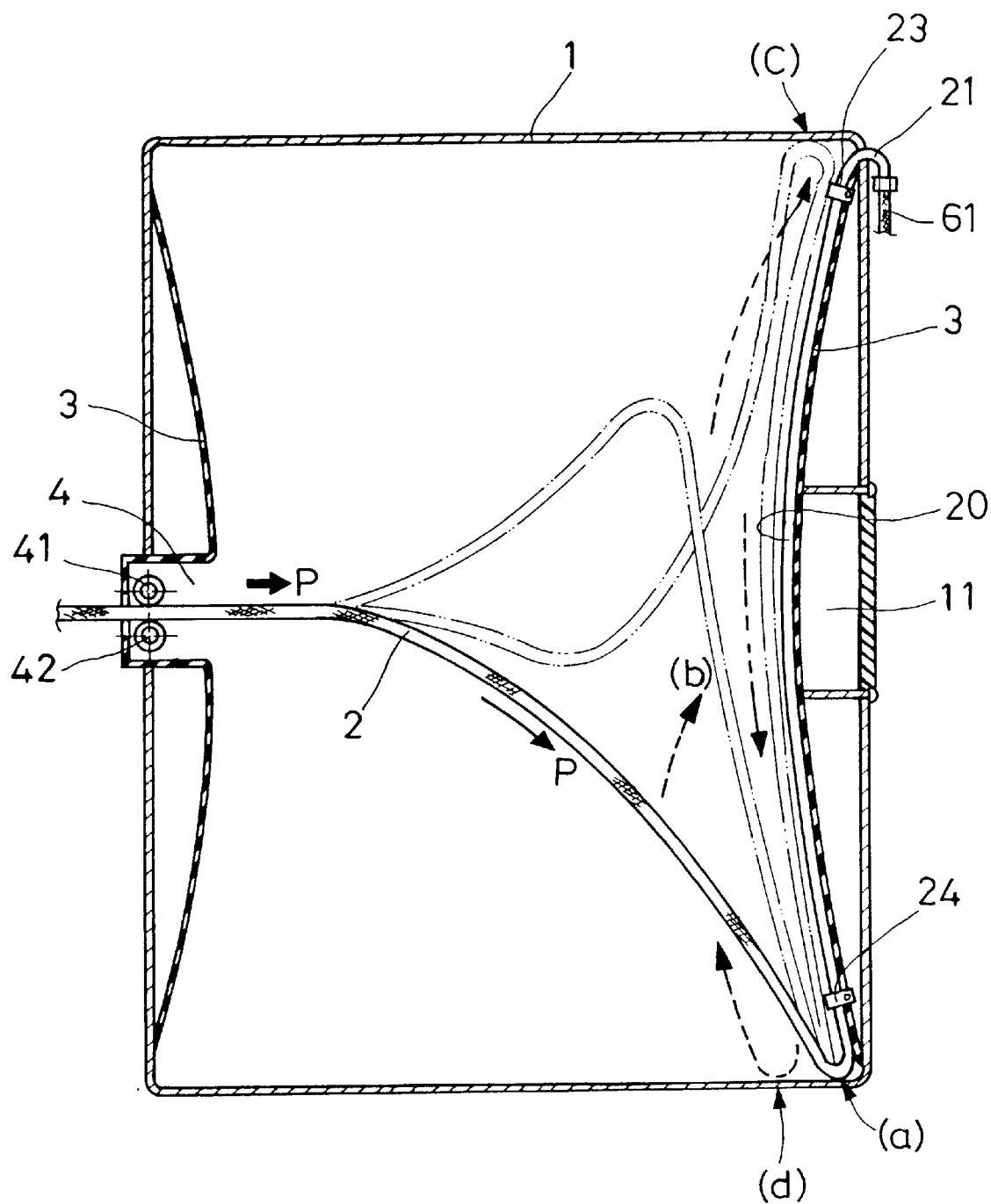
FIG. 2 is a sectional view of the present invention, showing the twin line welding hose pushed back into the casing and folded up and down.

Referring to Figures from 1 through 3, a hose take-up apparatus comprises a flat casing 1. The width W of the flat holding space defined within the casing 1 is approximately equal to the width of the twin line welding hose 2. Two arched boards 3 are bilaterally provided inside the casing 1. The arched boards 3 respectively curved outwards toward each other, defining with top and bottom side walls of the casing 1 a holding space having a narrower middle portion and relatively broader upper and lower portions. An outlet 4 is formed on the front side wall of the casing 1 through the middle part of one of the arched board 3. Two guide members 41 and 42 are provided inside the outlet 4 at different elevations for guiding the twin line welding hose 2 in and out of the casing 1 through the outlet 4. The twin line welding hose 2 has an input end 21 fixedly secured in place at a location adjacent to the back side wall of the casing 1 at the top (or bottom) side by a positioning device 23 and extended out of a hole (not shown) at the back side wall of the casing 1 and then connected to external gas supply tubes 61, and an output end 22 inserted through the gap between the guide members 41 and 42 and extended out of the casing 1 through the outlet 4 and then connected to a cutting torch (or welding torch) E. The aforesaid guide members 41 and 42 can be guide pulleys, guide boards, or any of a variety of guide devices practical for guiding the twin line welding hose 2 out of the casing 1 through the outlet 4.

Figure 3:
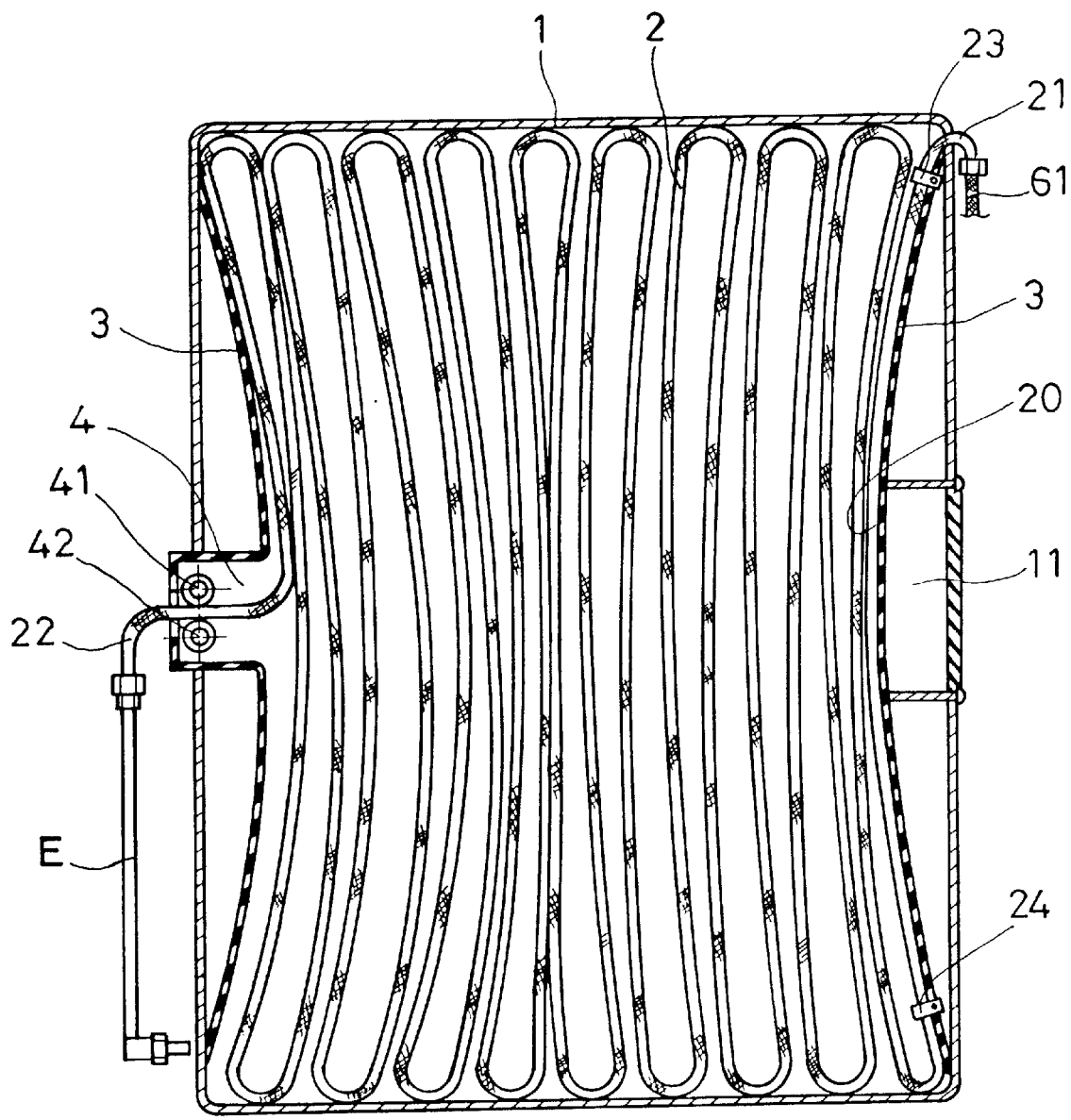
FIG. 3 is another sectional view of the present invention, showing the twin line welding hose received inside the casing.

Referring to FIGS. 2 and 3 again, the tail portion 20 of the twin line welding hose 2 is secured to one arched board 3 adjacent to the back side wall of the casing 1 at the bottom (or top) side by a positioning device 24, i.e., the two distal ends of the tail portion 20 of the twin line welding hose 2 are respectively secured in place inside the casing 1 near two opposite ends of one arched board 3 by the positioning devices 23 and 24, such that when an inward pressure P is applied to the twin line welding hose 2 to force the twin line welding hose 2 backwards to the inside of the casing 1, a resisting force is produced in the back bottom corner (a) against the twin line welding hose 2, causing the twin line welding hose 2 to be turned upwards in direction (b). After a part of the twin line welding hose 2 has been turned upwards in direction (b), the twin line welding hose 2 immediately receives a resisting force at location (c), thereby causing the twin line welding hose 2 to be turned downwards in direction (d). Therefore, continuously applying an inward pressure P to the twin line welding hose 2 causes the twin line welding hose 2 to be continuously and alternatively folded up and down and orderly received inside the casing 1 as shown in FIG. 3. Further, a small tool box 11 may be provided between the rear sided arched board 3 and the back side wall of the casing 1 for holding flame spreader tip, lighter, or any of a variety of small storage items. The installation of the small tool box 11 simultaneously reinforces the structural strength of the corresponding arched board 3.

Figure 4:
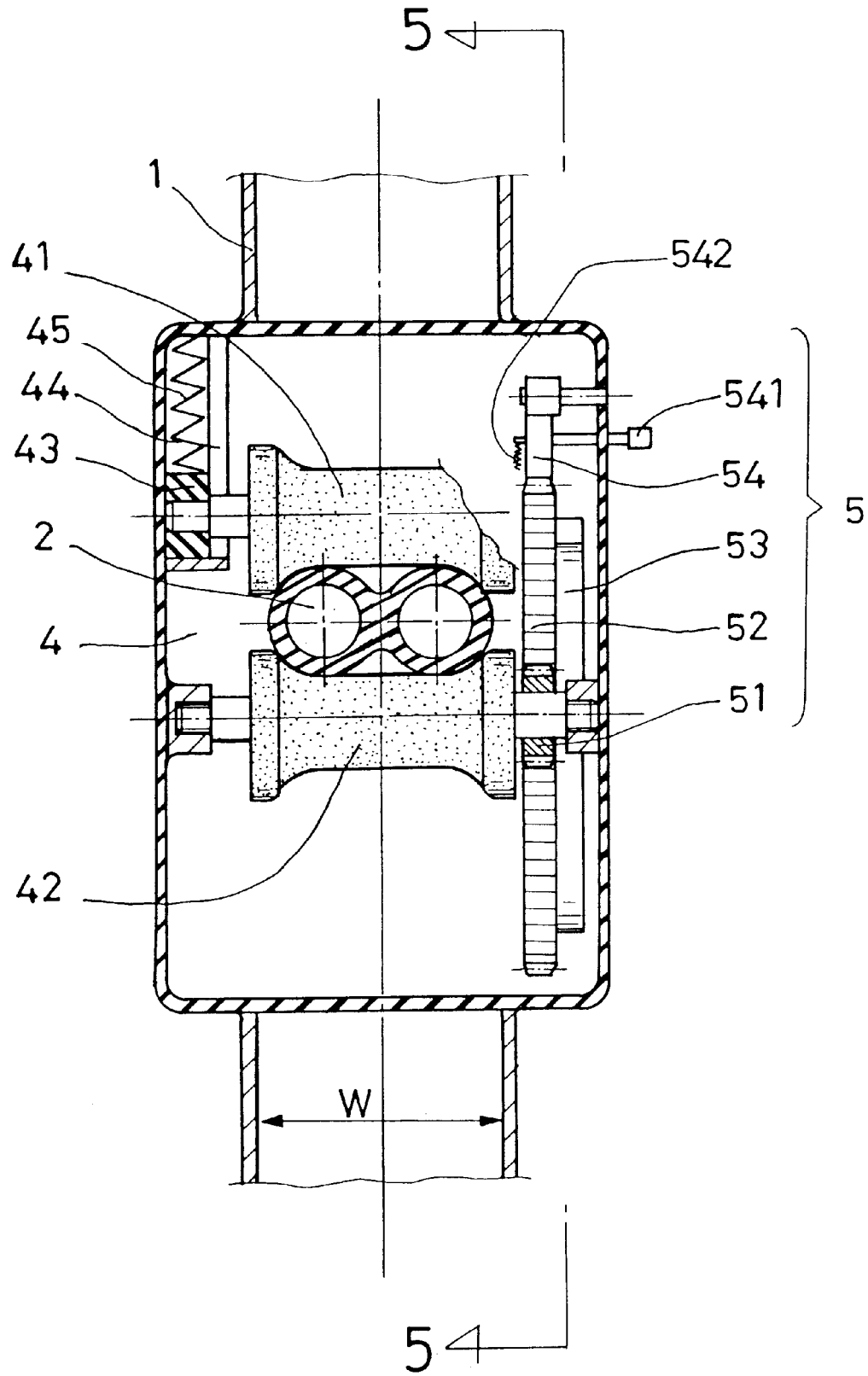
FIG. 4 is a sectional view in an enlarged scale of a part of the present invention, showing the guide members and the winding mechanism installed in the outlet inside the casing.

Referring to FIG. 4, the guide members 41 and 42 are mounted inside the outlet 4 in the casing 1, wherein the lower guide member 42 can be rotated on its own axis but prohibited from vertical displacement, the upper guide member 41 is revolvably supported between two axle bearings 43, which are moved in a respective vertical sliding groove 44 and held down by a respective spring member 45.

Figure 5:
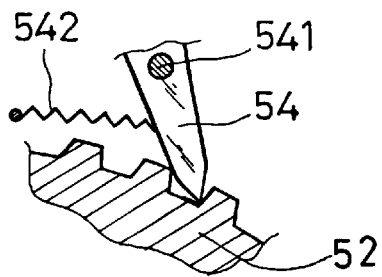
FIG. 5 is a sectional view taken along line 5—5 of FIG. 4, showing the twin line welding hose extended out of the outlet.
Figure 5:
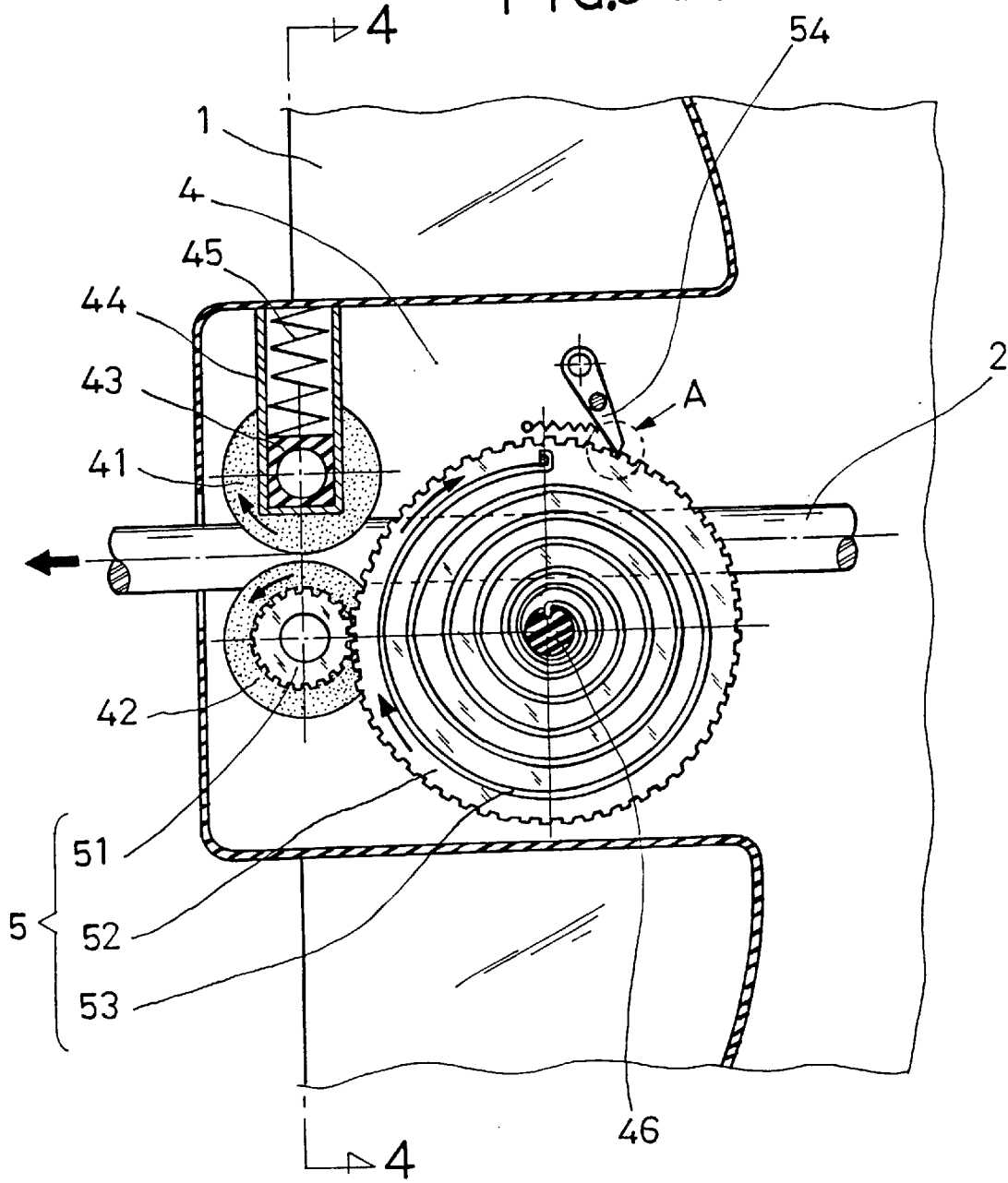

Referring to FIG. 5 and FIG. 4 again, a winding mechanism 5 is provided inside the casing 1 adjacent to the lower guide member 42. The winding mechanism 5 comprises a small gear 51 fixedly fastened to one end of the lower guide member 42, a big gear 52 turned about a fixed axle 46 inside the casing 1 and meshed with the small gear 51, a spiral spring 53 provided at one side of the big gear 52, the spiral spring 53 having an inner end fixedly fastened to the fixed axle 46 and an outer end fixedly fastened to the big gear 52, and a pawl 54 turned about an axis and pulled by spring means 542 into engagement with the teeth of the big gear 52 to stop the big gear 52 from reverse rotation. When the twin line welding hose 2 is pulled out of the casing 1 through the outlet 4, the lower guide member 42 is rotated counter-clockwise, and the upper guide member 41 is rotated clockwise. During counter-clockwise rotation of the lower guide member 42, the small gear 51 is rotated with the lower guide member 42, causing the big gear 52 to be rotated clockwise. Rotating the big gear 52 clockwise causes the spiral spring 53 to be taken up. When the outward pulling force is released from the twin line welding hose 2, the big gear 52 is stopped in position by the pawl 54, and the twin line welding hose 2 is maintained in the extended position.

Figure 6A:
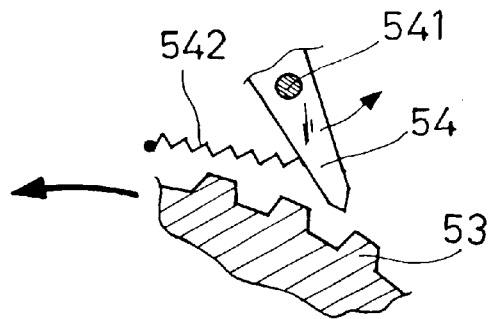
FIG. 6A is an enlarged view of a part of FIG. 6.
Figure 6:
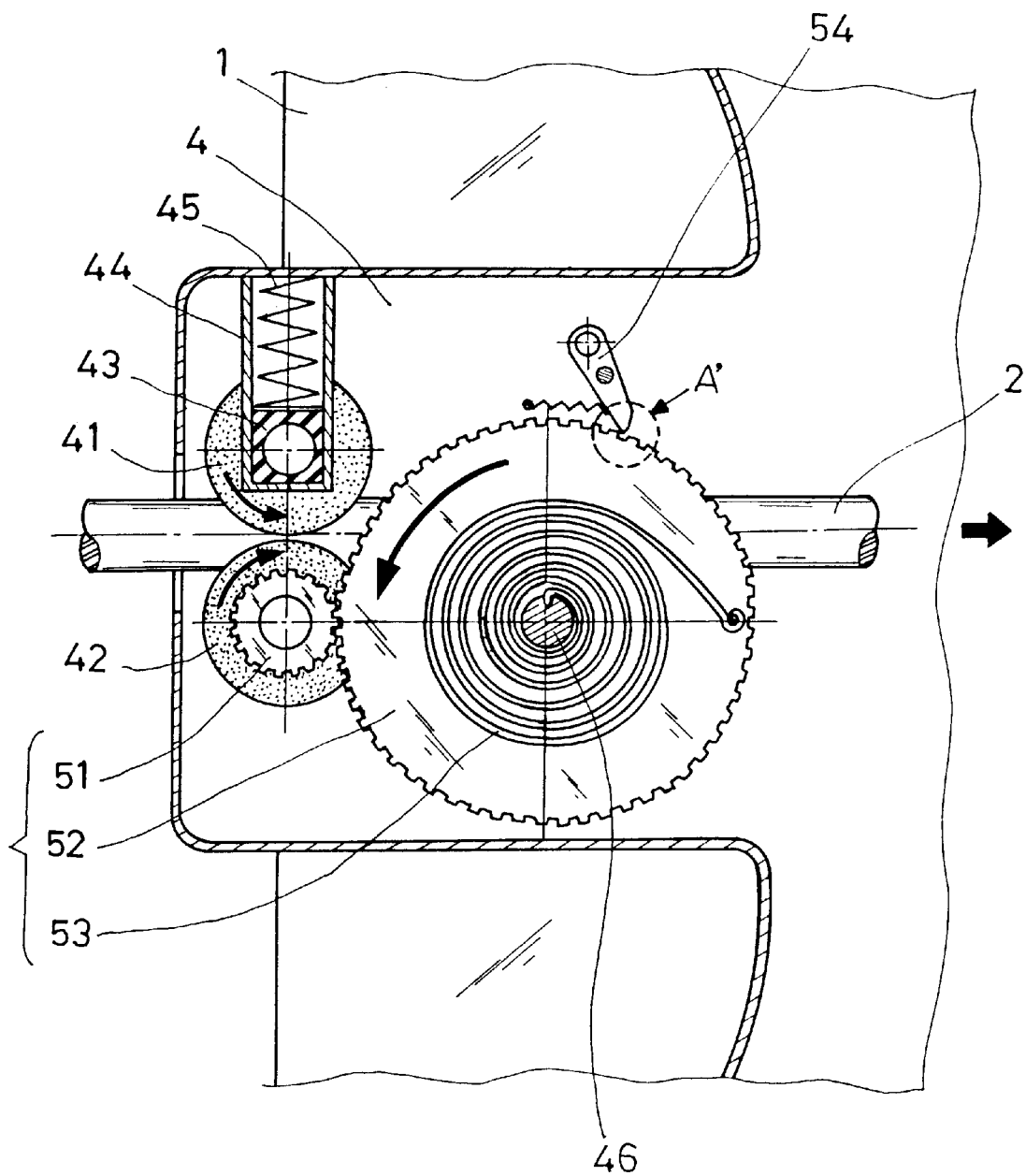
FIG. 6 is similar to FIG. 5 but showing the twin line welding hose taken up.

Referring to FIG. 6 and Figures from 1 through 3 again, the pawl 54 has a finger rod 541 extended out of the casing 1. Through the finger rod 541, the pawl 54 can be turned with the hand and disengaged from the big gear 52. After disengagement of the pawl 54 from the big gear 52, the spiral spring 53 is released from the constraint, therefore the big gear 52 is rotated counter-clockwise by the spring power of the spiral spring 53 to take up the twin line welding hose 2, causing the twin line welding hose 2 to be folded up and orderly received inside the casing 1. Therefore, the hose take-up apparatus can automatically take up the twin line welding hose 2 after each use.

Figure 7:
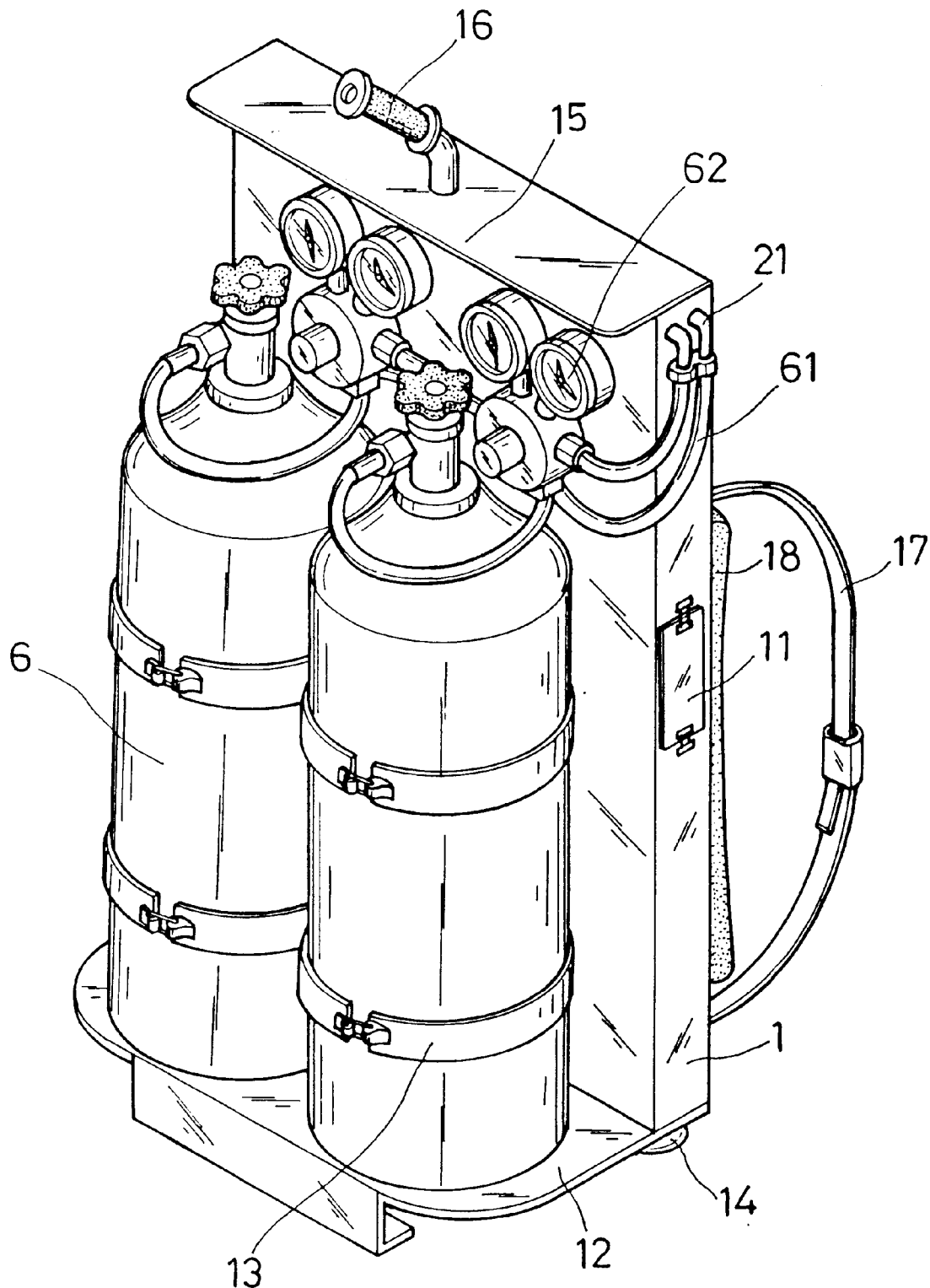
FIG. 7 illustrates an application example of the present invention.

Referring to FIG. 7, the hose take-up apparatus is fixedly fastened to a rack 12, which carries two gas cylinders 6 (one acetylene cylinder and one oxygen cylinder). The gas cylinders 6 are fastened to one lateral side wall of the casing 1 of the hose take-up apparatus by harness means 13. The gas supply tubes 61 of the gas cylinders 6 are respectively connected to the input end 21 of the twin line welding hose 2.

Figure 8:
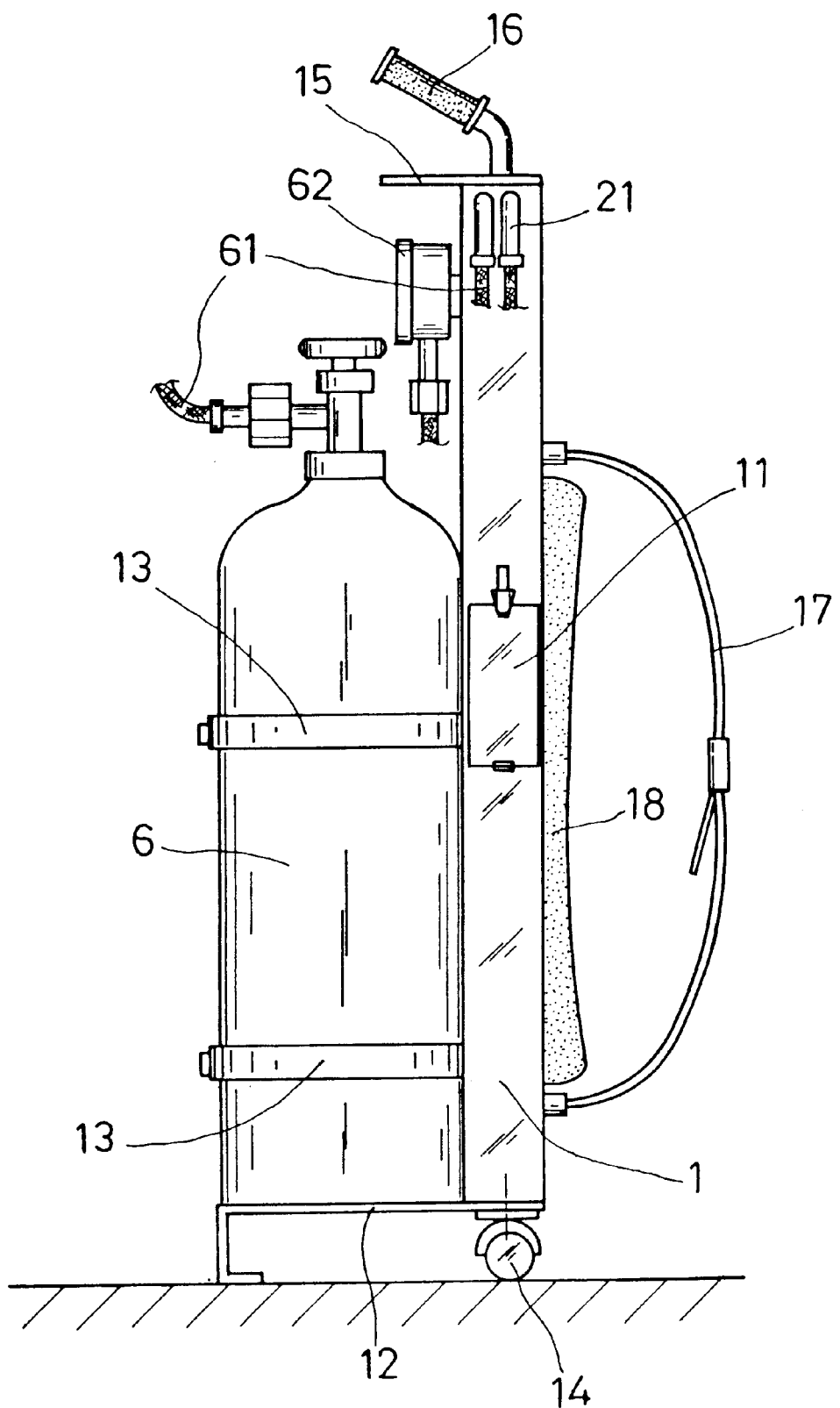
FIG. 8 is a right side view of FIG. 7.
Figure 9:
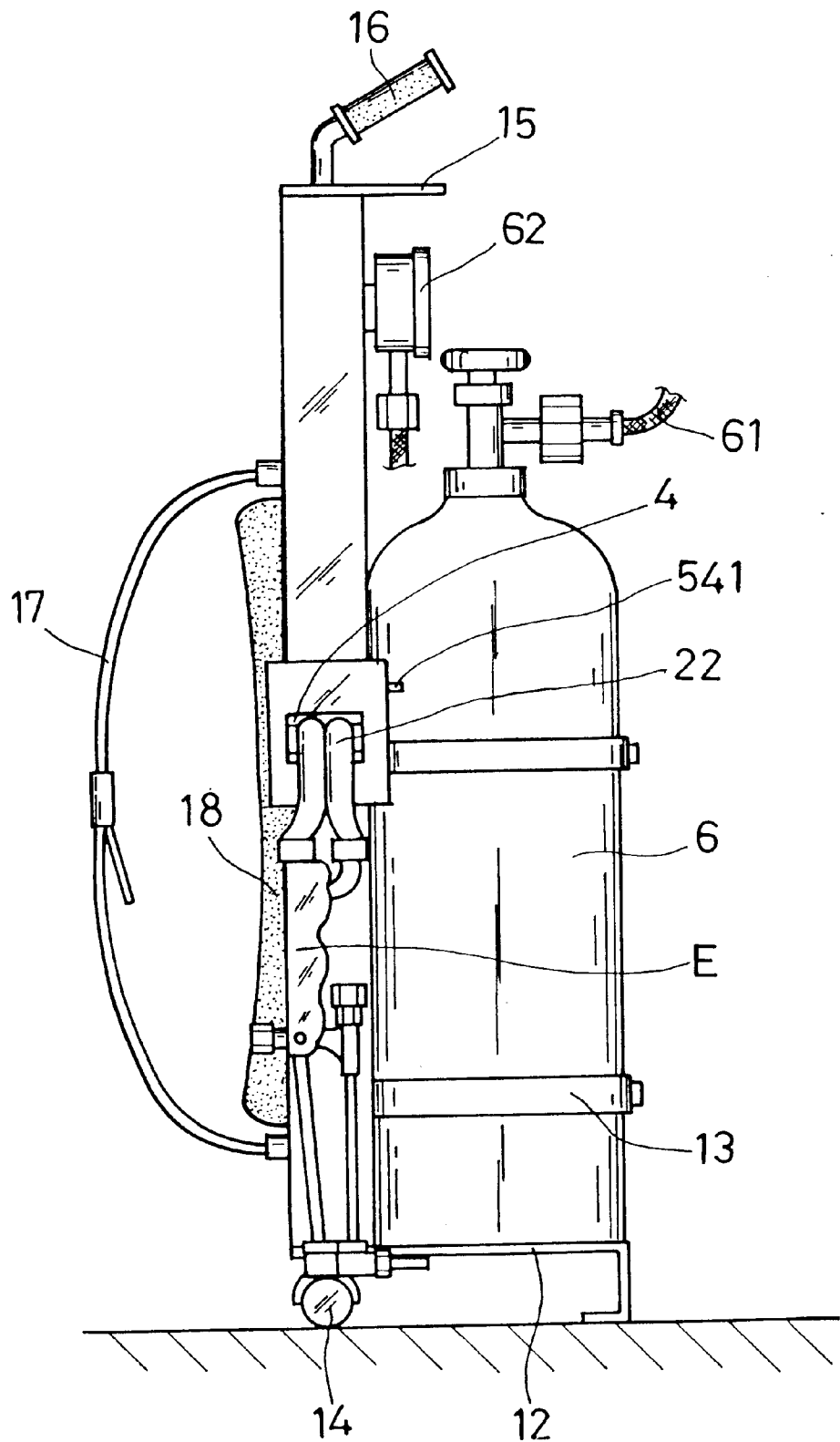
FIG. 9 is a left side view of FIG. 7.
Figure 10:
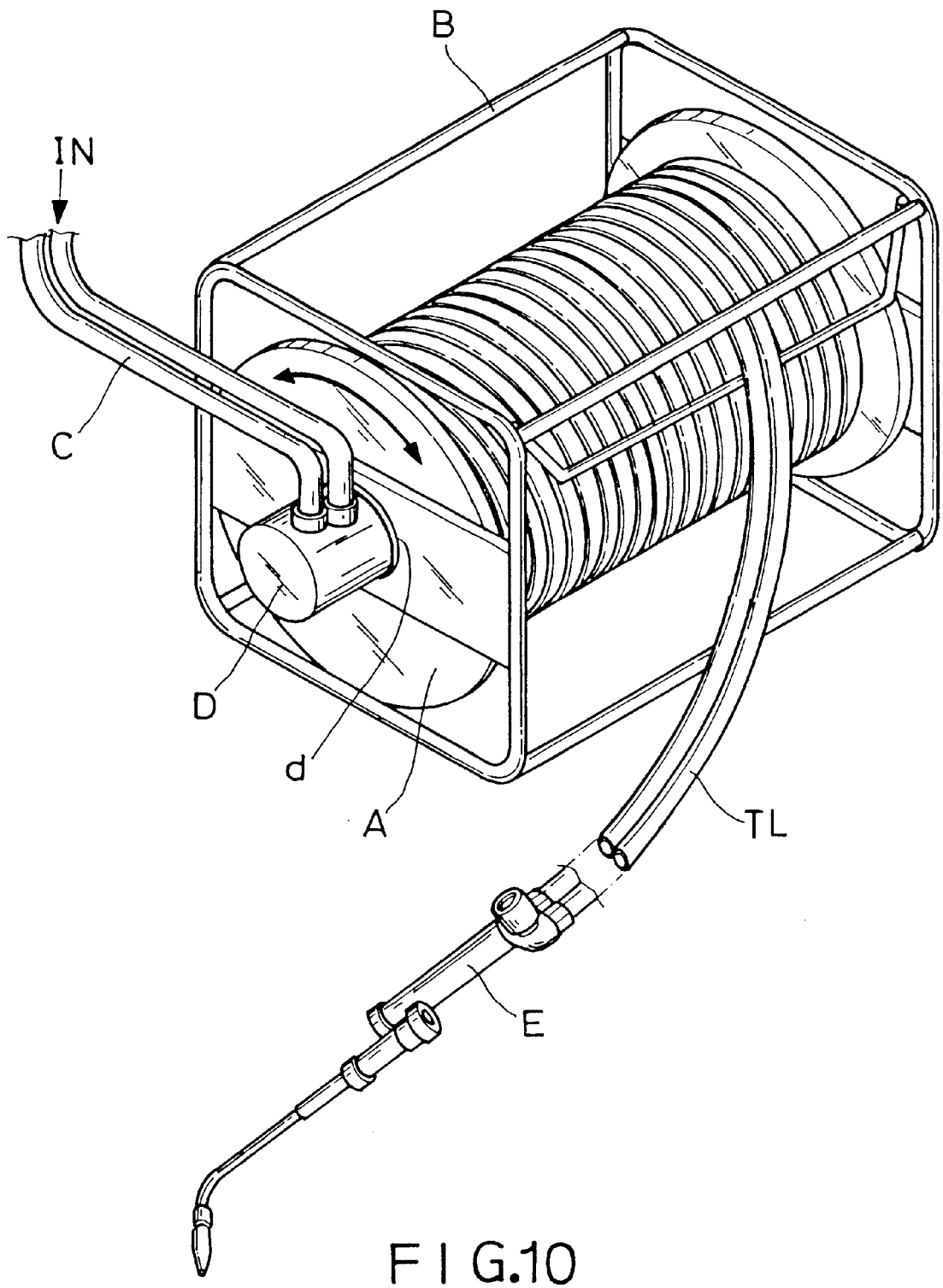
FIG. 10 shows a hose take-up apparatus according to the prior art.

Referring to FIGS. 8 and 9 and FIG. 7 again, wheels 14 are symmetrically provided at the bottom wall of the rack 12 near the rear side. A top guard 15 is provided at the top side wall of the casing 1 to protect the pressure regulators 62 of the gas cylinders 6. A drag handle 16 is fixedly mounted on the top guard 15 at the top. When the casing 1 is kept in vertical, the rack 12 is firmly supported on the floor. When the casing 1 is tilted, the bottle cart 12, the hose take-up apparatus, the rack 12 and the gas bottles 6 are all supported on the wheels 14, the whole assembly of the bottle cart 12, the hose take-up apparatus, the rack 12 and the gas bottles 6 can then be conveniently pulled by hand to move on the floor. Further, a back pad 18 and a shoulder strap 17 are provided at one lateral side wall of the casing 1 opposite to the gas cylinders 6, enabling the whole assembly of the bottle cart 12, the hose take-up apparatus, the rack 12 and the gas bottles 6 to be carried on worker's back. Therefore, the whole welding equipment can be conveniently carried by the worker to the job site for operation.

As indicated above, the present invention provides a hose take-up apparatus which enables the twin line welding hose of a welding equipment to be automatically received inside a casing in a good order after each use. The hose take-up apparatus can be arranged with a welding equipment together, enabling the welding equipment to be conveniently carried on the user's back to the job site.

It is to be understood that the drawings are designed for purposes of illustration only, and are not intended for use as a definition of the limits and scope of the invention disclosed.

What the invention claimed is:

1. A take-up apparatus comprising:
   a flat casing, said casing having a receiving chamber surrounded by a front side wall, a rear side wall, a top side wall, a bottom side wall, and two opposing lateral side walls, said casing having an outlet formed in said front side wall;
   a twin line welding hose disposed in said receiving chamber of said casing, said twin line welding hose having an input end firmly secured to one end of said rear side wall of said casing and extending out through a hole formed in said rear side wall of said casing for respective connection to external gas supply containers, said twin line welding hose having an output end extending from said receiving chamber through said outlet in said front side wall for coupling a torch; and,
   an upper guide member and a lower guide member mounted inside said casing adjacent said outlet and at different elevations for guiding said twin line welding hose in and out of said casing, said upper guide member and said lower guide member defining a gap therebetween into which a portion of said twin line welding hose is disposed, said lower guide member being rotated on an axis and prohibited from vertical displacement, said upper guide member being revolvably supported between two axle bearings, said two axle bearings being moved in a respective vertical sliding groove inside said casing and held down by a respective spring member.

2. The hose take-up apparatus of claim 1 further comprising a winding mechanism mounted inside said casing adjacent to said outlet for taking up said twin line welding hose, said winding mechanism comprises a small gear fixedly fastened to one end of said lower guide member, a big gear turned about a fixed axle inside said casing and meshed with said small gear, a spiral spring provided at one side of said big gear, said spiral spring having an inner end fixedly fastened to said fixed axle and an outer end fixedly fastened to said big gear, and a pawl turned about an axis and pulled by spring means into engagement with said big gear to stop said big gear from reverse rotation.

3. The hose take-up apparatus of claim 2 wherein said pawl comprises a finger rod extended out of said casing for turning by hand to disengage said pawl from said big gear.

* * * * *